(12) United States Patent
Alonso Esteban et al.

(10) Patent No.: US 9,807,822 B2
(45) Date of Patent: Oct. 31, 2017

(54) INDUCTIVELY HEATED HOB HAVING A METAL-COATED COVER PLATE

(75) Inventors: Rafael Alonso Esteban, Huesca (ES); Miguel Angel Buñuel Magdalena, Saragossa (ES); Francisco Javier Ester Sola, Saragossa (ES); Jose-Ramon Garcia Jimenez, Saragossa (ES); Francisco Javier Pelayo Zueco, Saragossa (ES); Pilar Perez Cabeza, Saragossa (ES); Fernando Planas Layunta, Saragossa (ES); Diego Sancho Martinez, Logroño (ES); Jesus Mario Subias Domingo, Saragossa (ES); Francisco Villuendas Yuste, Saragossa (ES)

(73) Assignee: BSH Hausgeräte GmbH, Munich (DE)

( * ) Notice: Subject to any disclaimer, the term of this patent is extended or adjusted under 35 U.S.C. 154(b) by 1127 days.

(21) Appl. No.: 13/388,465

(22) PCT Filed: Aug. 6, 2010

(86) PCT No.: PCT/EP2010/061504
§ 371 (c)(1),
(2), (4) Date: Feb. 2, 2012

(87) PCT Pub. No.: WO2011/020720
PCT Pub. Date: Feb. 24, 2011

(65) Prior Publication Data
US 2012/0138596 A1 Jun. 7, 2012

(30) Foreign Application Priority Data

Aug. 17, 2009 (EP) .................................... 09382146
Aug. 18, 2009 (ES) .................................... 200930604

(Continued)

(51) Int. Cl.
*H05B 6/12* (2006.01)
*C03C 17/36* (2006.01)

(52) U.S. Cl.
CPC ........... *H05B 6/1209* (2013.01); *C03C 17/36* (2013.01); *C03C 17/3605* (2013.01); *C03C 2218/36* (2013.01)

(58) Field of Classification Search
USPC ..... 219/452.11, 443.1, 444.1, 447.1, 448.12, 219/633, 4, 60, 601, 620–627; 428/221,
(Continued)

(56) References Cited

U.S. PATENT DOCUMENTS 2,184,282 A * 12/1939 Capita .......................... 219/604
3,530,499 A * 9/1970 Schroeder ..................... 219/624
(Continued)

FOREIGN PATENT DOCUMENTS

WO   WO 2006082753 A1 *  8/2006
WO       2007118744 A1    10/2007

OTHER PUBLICATIONS

International Search Report PCT/EP2010/061504.

*Primary Examiner* — Dana Ross
*Assistant Examiner* — Lawrence Samuels
(74) *Attorney, Agent, or Firm* — Michael E. Tschupp; Andre Pallapies; Brandon G. Braun

(57) ABSTRACT

A hob includes at least one heating inductor and a glass or glass ceramics cover plate that has at least one side coated with a metal layer coated with a metal layer. In order to improve the electromagnetic compatibility of the hob with a metal layer coating, the metal layer has a cover region which covers the heating inductor and is electrically insulated from a surrounding region of the metal layer, which surrounding region surrounds the cover region.

20 Claims, 2 Drawing Sheets

(30) Foreign Application Priority Data

| | | |
|---|---|---|
| Aug. 18, 2009 | (ES) | 200930605 |
| Oct. 1, 2009 | (EP) | 09382191 |
| Nov. 5, 2009 | (ES) | 200930958 |

(58) Field of Classification Search
 USPC .......... 428/337, 426, 688; 99/451, 325
 See application file for complete search history.

(56) References Cited

U.S. PATENT DOCUMENTS

| | | | |
|---|---|---|---|
| 3,710,062 A * | 1/1973 | Peters, Jr. | 219/627 |
| 3,928,744 A * | 12/1975 | Hibino et al. | 219/624 |
| 3,947,652 A * | 3/1976 | Cobb | 219/622 |
| 3,989,916 A * | 11/1976 | Amagami et al. | 219/622 |
| 4,348,571 A * | 9/1982 | Dills | 219/622 |
| 4,649,249 A * | 3/1987 | Odor | 219/659 |
| 4,833,288 A * | 5/1989 | Poumey | 219/622 |
| 5,428,207 A * | 6/1995 | Essig et al. | 219/622 |
| 5,430,273 A * | 7/1995 | Bogdanski et al. | 219/624 |
| 5,686,006 A * | 11/1997 | Gaspard | 219/622 |
| 5,866,884 A * | 2/1999 | Cornec et al. | 219/622 |
| 6,150,636 A * | 11/2000 | Bogdanski et al. | 219/461.1 |
| 6,753,509 B2 * | 6/2004 | Gratz et al. | 219/448.17 |
| 7,041,945 B2 * | 5/2006 | Aihara et al. | 219/622 |
| 7,126,095 B2 * | 10/2006 | Alfredeen | 219/622 |
| 8,129,664 B2 * | 3/2012 | Keishima et al. | 219/622 |
| 2003/0094450 A1 * | 5/2003 | Clothier et al. | 219/622 |
| 2004/0245244 A1 * | 12/2004 | Hirota et al. | 219/624 |
| 2007/0119845 A1 * | 5/2007 | Song et al. | 219/460.1 |
| 2008/0073337 A1 * | 3/2008 | Haag | 219/622 |
| 2008/0190409 A1 * | 8/2008 | Demol et al. | 126/211 |
| 2008/0264931 A1 | 10/2008 | Vilato et al. | |
| 2009/0065500 A1 | 3/2009 | England et al. | |
| 2009/0084777 A1 * | 4/2009 | Oh et al. | 219/672 |

* cited by examiner

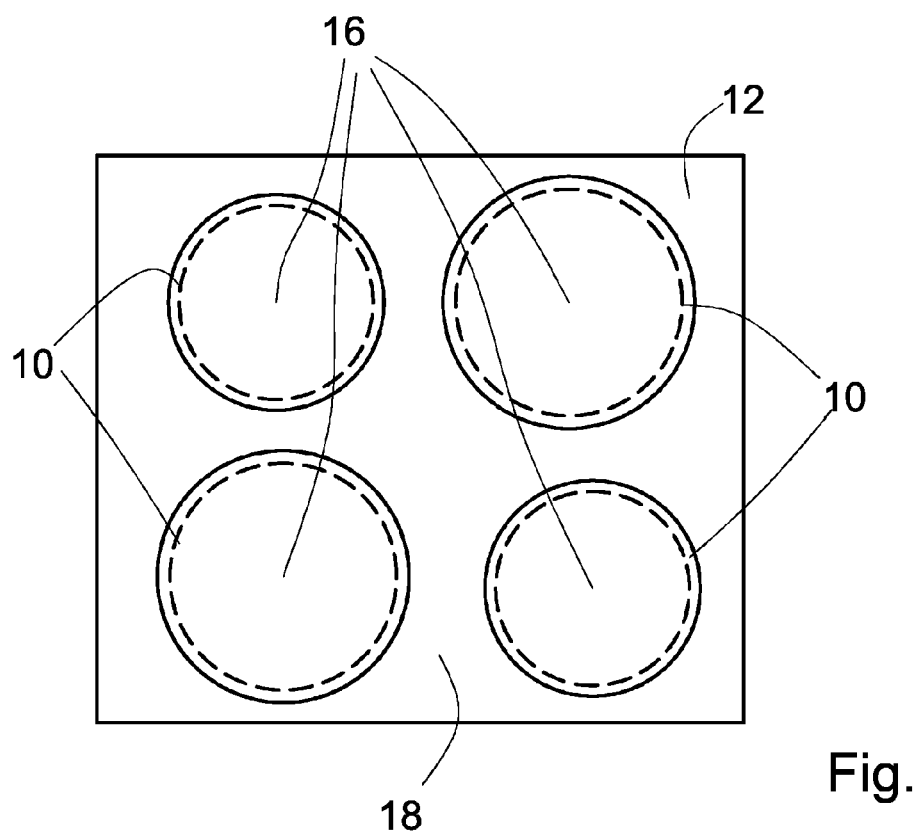
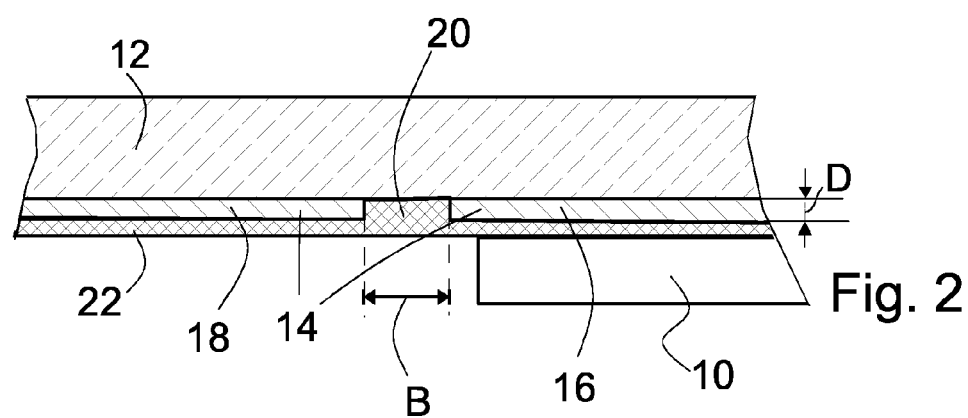

INDUCTIVELY HEATED HOB HAVING A METAL-COATED COVER PLATE

BACKGROUND OF THE INVENTION

The invention relates to a hob which comprises a metal-coated cover plate and to a method for producing a cover plate of this kind.

A hob with a cover plate is known from US 2008/0264931 A1 which is designed to cover one or more heating element(s). The cover plate is based on a glass or glass ceramics base body which is provided on at least one side with a metal layer to improve the aesthetic design options for such a hob.

Induction hobs are also known which have a plurality of inductors arranged under a cover plate and which produce a high-frequency alternating magnetic field. The alternating magnetic field penetrates the cover plate and produces eddy currents in a pot placed on the hob or in the base of the pot. These eddy currents heat the base in the desired manner.

Metals screen against magnetic fields very effectively. The technical preconception therefore exists that the use of metal-coated cover plates is disadvantageous for induction hobs. Even if metal layers with a layer thickness which is less than the penetration depth of the magnetic field are used, the currents induced in the layer by the magnetic field lead to uncontrolled and undesired electromagnetic radiation which can impair the electromagnetic tolerance of the appliance and makes fulfillment of the relevant standards relating to electromagnetic tolerance difficult.

BRIEF SUMMARY OF THE INVENTION

The invention is therefore based in particular on the object of improving the electromagnetic tolerance of a hob with a metal layer and of providing a method for producing a cover plate for such a hob.

The object is achieved in particular by a hob having the features of the invention and by a method according to the invention. Advantageous embodiments and developments of the invention emerge from the dependent claims.

The invention relates in particular to a hob comprising at least one heating inductor and a glass or glass ceramics cover plate that is coated with a metal layer on at least one side thereof.

It is proposed that a cover region of the metal layer covering the heating inductor is electrically insulated from a surrounding region of the layer, which surrounding region surrounds the cover region. The situation may therefore be avoided where inducted currents are exchanged between the cover region and the surrounding region. The maximum oscillation amplitude of charges in the metal layer is limited thereby, and this ultimately leads to reduced radiation intensity. The electromagnetic tolerance of the hob is improved as a result and adherence to the relevant standards is enabled even with a combination of a metal-coated cover plate with heating inductors.

The hob can be a pure induction hob or a hob with different heating elements which, for example, can include both inductors and radiating heating elements.

Sufficient coupling of the heating inductor to the cooking utensil element may be achieved despite the metal layer in particular if the thickness of the metal layer is only a fraction of less than 50%, particularly advantageously less than 10%, of a magnetic penetration depth of the magnetic field produced by the heating inductor into the material of the metal layer. The magnetic penetration depth is typically between 10 and 100 µm and describes the exponential decay of the magnetic field in a metal body. The penetration depth is also called the London penetration depth.

Effective insulation with a simultaneously decorative overall impression can be achieved if the cover region is limited by a linear interruption in the layer. The interruption can in particular be circular, oval or have the form of a regular polygon.

The interruption can clearly be seen and is therefore suitable for visualizing or limiting the heating zone formed by the heating element if a width of the interruption is at least 2 mm. Good visibility of the interruption line against the otherwise metal-acting background of the layer can be ensured even with a width of at least 1 mm.

To improve the visibility of the interruption it is also proposed that a dielectric colored layer is applied to the cover plate at least in the region of the interruption.

The dielectric colored layer can also act as a protective layer for the metal layer if the dielectric colored layer at least partially overlaps the metal layer.

The metal layer can in particular be applied to a back of the cover plate. Damage to the metal layer can be avoided thereby.

The interruption can, by way of example, be produced during the application of the metal layer by applying a mask or, alternatively, the metal layer can be removed in the region of the interruption. The metal layer can be removed either mechanically or using a laser for this purpose.

A further reduction in the electromagnetic emissions can be achieved if the cover region comprises a plurality of sections that are electrically insulated from each other. The sections can in particular be arranged concentrically to each other and in a particularly advantageous embodiment of the invention can have the form of concentric rings, which may also comprise one or more interruption(s) in the circumferential direction.

A further aspect of the invention relates to a method for producing a cover plate of the type described above. It is proposed that an interruption limiting the cover region is worked into the metal layer to electrically insulate a cover region of the metal layer covering the heating inductor.

Further advantages emerge from the following description of the drawings. Exemplary embodiments of the invention are shown in the drawings. The drawings, description and claims contain numerous features in combination. A person skilled in the art will expediently also consider the features individually and combine them to form meaningful further combinations.

BRIEF DESCRIPTION OF THE DRAWINGS

In the drawings:

FIG. 1 shows a hob with a cover plate according to a first embodiment of the invention, FIG. 2 shows a section of the hob from FIG. 1.

DETAILED DESCRIPTION OF EXEMPLARY EMBODIMENTS OF THE PRESENT INVENTION

Figure 3:
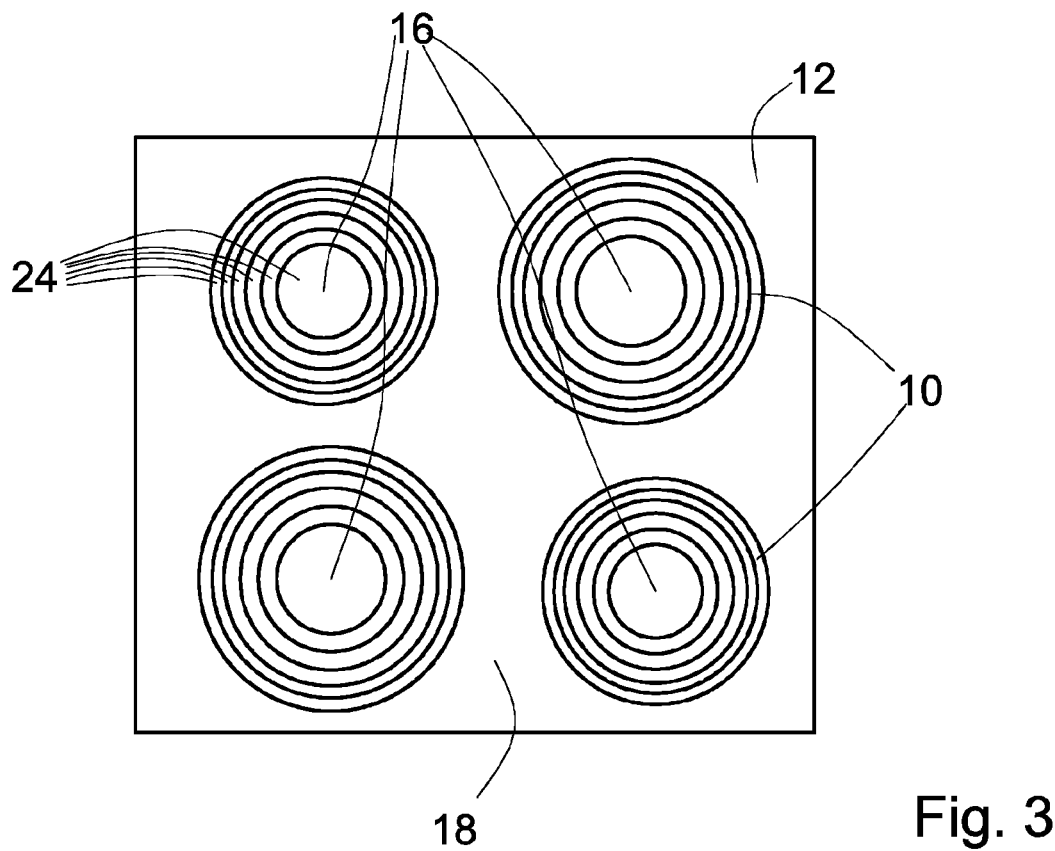
FIG. 3 shows a cover plate of a hob according to a further embodiment of the invention with a cover region having a plurality of concentric sections.

FIG. 1 shows a hob with four heating inductors 10 which are arranged below a glass or glass ceramics cover plate 12. The heating inductors 10 are fed with a high-frequency heating current and during operation of the induction hob produce a high-frequency magnetic field which penetrates the cover plate 12 and enters the base of a cooking utensil element placed on the hob. The eddy currents produced in the base of the cooking utensil element ultimately heat this base and therewith the food received in the pot or pan.

During operation heat is transferred in a region of the cover plate 12 covered by the base of the pot to the cover plate 12 due to contact with the cooking utensil element. From this it may be concluded that the cover plate 12 must be temperature resistant to at least 200 or 300° C. and be permeable to the magnetic field produced by the heating inductor 10. The surface of the cover plate 12 must also be robust and easy to clean.

Each of the heating inductors 10 is circular and arranged below a likewise circular cover region 16 of the cover plate 12 respectively, the cover region having the same diameter as the corresponding heating inductor 10. The cover regions 16 correspond to the regions on which pots should ideally be placed to allow efficient operation of the hob. The size of the pots should at least approximately match the size of the cover regions 16. The cover regions 16 are defined by a drawing provided on the back of the cover plate 12 which will be described in more detail below. Alternatively a marking defining the cover region 16 may also be applied to the top of the cover plate 12, by way of example in a screen printing process.

In particular the cover regions 16 are geometrically congruent to the shape of the heating inductors 10 and protrude beyond the contour thereof by at most 1 cm in plan view. The contour of the cover regions 16 substantially follows the contour of the heating inductors 10.

FIG. 2 shows a section of the hob according to FIG. 1 in the region of such a limit between a cover region 16 and a surrounding region 18 which surrounds the cover region 16.

The back of the cover plate 12 is provided with a coating with a metal layer 14, which can be applied, by way of example, in a magnetron sputtering process. A thickness D of the metal layer 14 is between about 5 and 40 nm and is therefore less than 50% of a magnetic penetration depth of the magnetic field produced by the heating inductor 10 into the material of the metal layer 14. The thickness D is greatly exaggerated in FIG. 2 for better visualization and in particularly advantageous embodiments of the invention is less than 10% of the penetration depth.

The cover region 16 is limited by a linear interruption 20 in the layer 14. The interruption 20 delimits the cover region 16 from the surrounding region 18 and forms the closed ring shown in FIG. 1. The interruption 20 therewith electrically insulates the cover region 16 from the surrounding region 18 and prevents eddy currents, induced by the magnetic field, being exchanged between the cover region 16 and the surrounding region 18. The electromagnetic tolerance is improved overall thereby.

The width B of the interruption 20 is approximately 1-2 mm, so the interruption 20 can be seen through the transparent material of the cover plate 12 from the front of the cover plate 12 as a clearly defined line with a width of 2 mm in the otherwise shiny metal background.

Following application of the metal layer 14 a dielectric protective and/or colored layer 22 is applied to the cover plate 12 in the region of the interruption 20. The protective and/or colored layer 22 prevents corrosion of or damage to the metal layer 14 and can be seen in the region of the interruption 20 from the front of the cover plate 12 as well. The color of the markings defining the cover regions 16 can therefore be chosen by way of the color selection of the dielectric colored layer 22. To optimally protect the metal layer 14 the dielectric protective and/or colored layer 22 can overlap the entire back of the cover plate 12 in a particularly advantageous embodiment.

FIG. 3 shows an alternative exemplary embodiment of the invention in which the cover region 16 comprises a plurality of sections 24 that are electrically insulated from each other. The sections 24 have the form of concentric circles. The electromagnetic tolerance of the hob is improved further thereby.

When producing the cover plate 12 the interruption 20 can either be produced by applying a mask during application of the metal layer 14 or by the subsequent removal of the layer 14, by way of example by a laser ablation process. When using a laser ablation process the sections 24 can be insulated from each other by way of example by very thin linear interruptions. These interruptions may be very thin, by way of example in the region of a few micrometers, so they do not disrupt the overall impression of the cover region 16 as a closed metal surface.

Figure 4:
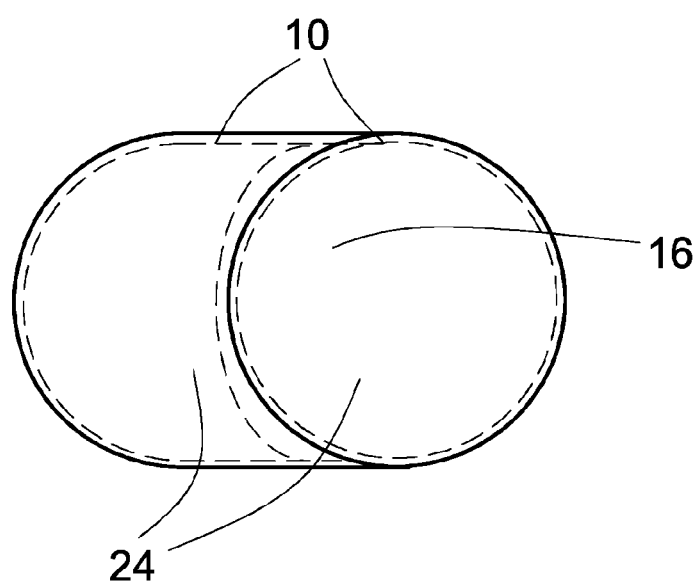
FIG. 4 shows an oval cover region according to a further embodiment of the invention.

FIG. 4 shows a further exemplary embodiment of the invention with an oval cover region 16 for covering a pair of inductors which can be operated together as roasting heating zones. The cover region 16 includes a plurality of sections 24 that are electrically insulated from each other here as well, the sections being adapted to the heating inductors 10.

In further embodiments of the invention the cover plate can be provided with a plurality of metal layers which may also be semi-transparent.

REFERENCE CHARACTERS 10 heating inductor
12 cover plate
14 layer
16 cover region
18 surrounding region
20 interruption
22 colored layer
24 section
B width
D thickness

The invention claimed is:

1. A hob, comprising:
   at least one heating inductor; and
   a glass or glass ceramics cover plate having at least one side coated with a metal layer, said metal layer having a cover region which covers the heating inductor, and a surrounding region which surrounds the cover region, said cover region being electrically insulated from the surrounding region.

2. The hob of claim 1, wherein the metal layer has a thickness which is less than 50% of a magnetic penetration depth of a magnetic field produced by the heating inductor into a material of the metal layer.

3. The hob of claim 1, wherein the metal layer has a thickness which is less than 10% of a magnetic penetration depth of a magnetic field produced by the heating inductor into a material of the metal layer.

4. The hob of claim 1, wherein the cover region is delimited by a linear interruption in the metal layer.

5. The hob of claim 4, wherein the interruption has a width of at least 2 mm.

6. The hob of claim 4, further comprising a dielectric colored layer applied to the cover plate at least in a region of the interruption.

7. The hob of claim 6, wherein the dielectric colored layer at least partially covers the metal layer.

8. The hob of claim 4, wherein the interruption is produced by applying a mask during application of the metal layer.

9. The hob of claim 4, wherein the interruption is produced by removing material of the metal layer following application of the metal layer.

10. The hob of claim 1, wherein the cover region comprises a plurality of sections that are electrically insulated from each other.

11. The hob of claim 10, wherein the sections are arranged concentrically to each other.

12. The hob of claim 11, wherein the sections have the form of concentric rings.

13. A method for producing a glass or glass ceramics cover plate for a hob, comprising:
    coating at least one side of a cover plate with a metal layer; and
    working an interruption into the metal layer to delimit a cover region of the metal layer, which cover region covers a heating inductor of the hob, and to electrically insulate the cover region from a surrounding region of the metal layer.

14. The hob of claim 1, wherein the metal layer is directly adjacent to the cover plate.

15. The hob of claim 1, wherein the cover region is separated from the surrounding region by a continuous interruption in the metal layer.

16. The hob of claim 15, further comprising a dielectric colored layer applied to the cover plate at least in a region of the interruption.

17. The hob of claim 16, wherein the dielectric colored layer at least partially covers the metal layer.

18. The hob of claim 17, wherein the dielectric colored layer completely covers the metal layer.

19. The hob of claim 18, wherein the metal layer is directly adjacent to the cover plate.

20. A hob, comprising:
    an induction heater configured to heat a cooking vessel by producing a magnetic field that generates eddy currents in the cooking vessel; and
    a glass or glass ceramics cover plate having a lower side directed to the induction heater, the cover plate having a metal layer applied to the lower side of the cover plate, the metal layer having
        a cover region which covers the induction heater, and
        a surrounding region which surrounds the cover region,
    wherein the cover region is electrically insulated from the surrounding region.

* * * * *